United States Patent [19]

Crockatt et al.

[11] Patent Number: 4,681,910

[45] Date of Patent: Jul. 21, 1987

[54] AQUEOUS WATER-REPELLENT COATINGS

[75] Inventors: William B. Crockatt, Mississauga; John Rimma, Oakville, both of Canada

[73] Assignee: DeSoto, Inc., Des Plaines, Ill.

[21] Appl. No.: 818,036

[22] Filed: Jan. 13, 1986

[51] Int. Cl.[4] .................. C08L 23/04; C08L 33/06; C08L 91/04; C08L 91/06

[52] U.S. Cl. ................................ 524/487; 524/318; 524/396; 524/488; 524/489; 524/501

[58] Field of Search ............... 524/487, 488, 489, 501, 524/318, 396

[56] References Cited

U.S. PATENT DOCUMENTS

| | | | |
|---|---|---|---|
| 4,163,673 | 8/1979 | Deckert | 524/488 |
| 4,317,755 | 3/1982 | Gregory | 524/488 |
| 4,394,475 | 7/1983 | Temple et al. | 524/488 |
| 4,439,563 | 3/1984 | Sackis et al. | 524/487 |
| 4,439,575 | 3/1984 | Schwarz | 524/487 |
| 4,495,319 | 1/1985 | Sackis et al. | 524/487 |

*Primary Examiner*—Allan M. Lieberman
*Attorney, Agent, or Firm*—Dressler, Goldsmith, Shore, Sutker & Milnamow, Ltd.

[57] ABSTRACT

Aqueous, air drying latex coating compositions contain a large proportion of wax which dries to provide a continuous and durable film from which the wax exudes slowly and progressively to the surface over a long period of time to provide long-term water repellency. The coatings are primarily intended for application to exterior wood surfaces.

14 Claims, No Drawings

AQUEOUS WATER-REPELLENT COATINGS

TECHNICAL FIELD

This invention relates to aqueous, air drying water-repellent latex coating compositions which include a large proportion of wax and provide long-term water repellency and durability on exterior exposure. These coatings are primarily intended for application to exterior wood surfaces.

BACKGROUND OF THE INVENTION

The coatings industry has long sought to develop coating compositions that can be applied to wood surfaces to provide air drying coatings which demonstrate long-term water repellency and durability on exterior exposure.

It is known that the presence of a wax in a coating provides water repellency. In certain prior coatings, a paraffin wax was melted, dissolved in an organic solvent and incorporated into the organic solvent-based coating composition as a solution. However, only a small proportion of wax can be incorporated in this manner. This is unsuitable for many exterior applications where larger amounts of wax are needed to extend the duration of water repellency.

Organic solvent-based coating compositions have been developed which include a large proportion of paraffin wax and which provide coatings with the foregoing properties of water repellency and durability (see U.S. Pat. No. 4,450,247 which issued on May 22, 1984 and which is assigned to DeSoto, Inc., the assignee of this invention). Such coating compositions include a solution of an alkyd resin in mineral spirits.

But the use of large amounts of organic solvents in such coating compositions leads to numerous environmental and other known disadvantages because of the presence of a solvent. It is desirable to minimize these disadvantages through the use of coatings which contain minimal amounts of volatile organic solvents. Thus, a need exists for aqueous coatings which substantially duplicate the water repellency and the durability of the patented solvent-based coatings.

In U.S. application Ser. No. 681,207, filed Dec. 13, 1984 (now U.S. Pat. No. 4,576,987 issued Mar. 18, 1986) which is also assigned to DeSoto, Inc., we disclose aqueous, air drying water-repellent latex coating compositions that include an aqueous microcrystalline wax dispersion, an aqueous latex of emulsion copolymerized monoethylenically unsaturated monomers and an aqueous dispersion of an N-methylol functional self-crosslinking polyurethane.

The polyurethane component provides several functions, one of which is to toughen the coating. This is helpful when the copolymerized unsaturated monomers are of the type that do not readily dry in air to form hard films in the absence of a curing agent. For example, certain polymers of monoethylenically unsaturated monomers in aqueous emulsion do not coalesce adequately at low temperatures (less than about 20 degrees C.) so when these polymers are softened for adequate coalescence, they require the presence of a curing agent to provide the desired film hardness. The use of such a curing agent, however, adds to the cost of the coating composition, and it impairs the adhesion needed when largely unpigmented coatings are used on decks.

It is desirable, therefore, to provide aqueous latex coating compositions which dry under ambient conditions to form durable water-repellent films and which include a large proportion of wax, but which do not include substantial amounts of organic solvents or curing agents. These coating compositions should coalesce below about 25 degrees C. and preferably below about 20 degrees C.

Moreover, and even when the copolymer has sufficient hardness, it is desired to provide improved adhesion and wear resistance for deck application.

DISCLOSURE OF THE INVENTION

In accordance with this invention, an aqueous latex coating composition includes a large proportion of wax and dries in air under ambient conditions to provide a continuous and durable water-repellent film.

As used herein, the term "ambient conditions" refers to atmospheric pressure and temperatures in the range of at least about 0 degrees C. to about 30 degrees C. The wax of the present coating composition slowly and progressively exudes to the surface of the film to form a water-repellent surface that persists for a long period of time; i.e., at least for several months and, preferably, for several years.

The term "water-repellent" as used herein, indicates a hydrophobic film which causes water to bead on the surface of the film without penetrating the film. The terms "water-resistant" and "water resistance", on the other hand, indicate a film that does not readily degrade or deteriorate in the presence of water, but the film does not necessarily repel water. Most coatings are water resistant to some degree, few coatings are water repellent.

The coating composition consists essentially of (1) from about 5 percent to about 50 percent, preferably from 15 percent to 40 percent, by weight of an aqueous wax dispersion including a petroleum wax, a polyethylene wax and a surfactant; and (2) from about 50 percent to about 95 percent, preferably from 60 percent to 85 percent, by weight of an aqueous latex of emulsion copolymerized monoethylenically unsaturated monomers.

As a feature of this invention, improved adhesion and wear resistance are provided by the inclusion of an aqueous emulsion of an unsaturated oil or fatty acid thereof together with a catalyst for the drying reaction, typically a cobalt naphthenate. The proportion of this optional component may range from 5 percent to 50 percent, preferably from 10 percent to 40 percent.

The proportions disclosed herein are by weight of solids based on the total weight of solids in the composition not including any pigment which may be present.

The aqueous latex of emulsion copolymerized monoethylenically unsaturated monomers preferably have a sufficiently low glass transition temperature (Tg) to coalesce on air drying and provide a durable film. In general, aqueous emulsion copolymers having a Tg of from about 5 degrees C. to about 25 degrees C. are useful herein since these provide coatings which are soft enough to air dry in the presence of little or no organic solvent, and which are hard enough to be useful without added curing agent.

Film formation from emulsions involves loss of water by evaporation, followed by coalescence of the emulsified polymer particles to provide a continuous adherent film. There is a minimum temperature for each polymer system below which coalescence of the particles (or film formation) will not take place. This temperature is related to the "glass transition temperature" (designated Tg) of the polymer. This is the point of transition between a hard solid and a plastic or semi-fluid condition. The Tg of a monomer is the glass transition temperature of a homopolymer of the monomer. Such values are commonly determined by differential thermal analysis or by calculation from the monomers and their preparation in a known manner.

Emulsion-containing coating compositions can be applied at temperatures below the Tg of the polymer, and it is usual, therefore, to include a small proportion of a coalescing solvent in the formulation. These solvents can be stirred into the emulsion and dissolve in the polymer particles, resulting in a softening of the polymer and a momentary lowering of the Tg as the deposited coating dries. This helps the polymer particles to coalesce and produce a continuous film, whereupon the coalescing solvent evaporates. Solvents used for this purpose include certain glycol esters and ether-esters as will be described herein.

As indicated, the aqueous wax dispersion comprises a blend of at least about 30 percent of a petroleum wax (preferably, a paraffin wax), at least about 10 percent of a polyethylene wax and a surfactant. Preferably, the aqueous wax dispersion includes from about 40 percent to about 70 percent of a paraffin wax, from about 15 percent to about 25 percent of a polyethylene wax and enough surfactant to stabilize the dispersion, usually at least about 5 percent. More preferably, the aqueous wax dispersion includes from about 50 percent to about 60 percent paraffin wax, about 20 percent polyethylene wax and at least about 20 percent of a fatty acid salt surfactant (with ammonia or an alkali metal).

As indicated above, the foregoing proportions are by weight of solids based on the total weight of solids in the composition not including any pigment which may be present.

Wax selection is more critical in the present coating compositions than in the solvent-based or the aqueous coating compositions discussed above. Higher melting point waxes and carnauba wax may be used as the petroleum wax; but, as described herein, paraffin waxes are preferred. Paraffin waxes generally contain about 14 different straight chain and branched hydrocarbons ranging from $C_{18}H_{38}$ to $C_{32}H_{66}$ and solidify between about 27 degrees C. and about 70 degrees C. (between about 80.5 degrees F. and about 158 degrees F.).

According to this invention, the preferred paraffin waxes have melting points in the range of about 50 degrees C. to about 70 degrees C., more preferably from 55 degrees C. to 65 degrees C., for long-term durability of water-repellent properties, however the melting point range is not critical.

The aqueous wax dispersion also includes a polyethylene wax, which preferably has a number average molecular weight greater than about 10,000.

In the aforementioned '247 patent, it was necessary to stably incorporate the wax in an organic solvent-based solution. But since little solvent is used herein and since the waxes used are not themselves water dispersible, the wax dispersion is maintained with the aid of a surfactant.

The surfactant, which is preferably anionic or nonionic, provides a dispersion of fine particle size. If the surfactant is anionic, a defoaming agent may be employed to reduce bubble formation. If the surfactant is nonionic, a defoaming agent is usually not required. The selection of a particular surfactant, however, is not critical to the present invention.

The most common types of anionic surfactants are alkali metal salts of straight chain carboxylic sulfonic acids of about 11 to about 17 carbon atoms. Other types of compounds frequently used as anionic surfactants are water-soluble salts of amines and fatty acids (triethanolamine oleate); sulfated higher alcohols (sodium lauryl sulfate); sulfonated compounds (sulfonated castor oil) and aromatic petroleum sulfonates.

Anionic surfactants that are useful herein include sodium lauryl sulfate; sodium lauryl sulfonate; sodium dodecyl benzene sulfonate; sodium diisopropyl naphthalene sulfonate (an aerosol acrylaryl sulfonate surfactant that is commercially available from American Cyanamid Co., Wayne, N.J. under the product name Aerosol OS may be used); and disodium isodecyl sulfosuccinate, disodium alkyl amidoethanol sulfosuccinate, and disodium alkyl amido polyethoxy sulfosuccinate (aerosol disodium monoester sulfosuccinate surfactants available from American Cyanamid Co. under the product names Aerosol A-268, Aerosol 413 and Aerosol 200, respectively, may be used). Other suitable anionic surfactants include Lutensit A-ES surfactant, which is commercially available from BASF Corp., Holland, Mich.

Particularly suitable surfactants include at least one ammonium or alkali metal salt of a $C_{10}$ to $C_{22}$ saturated or unsaturated carboxylic acid; for example, the sodium and potassium salts of myristic, palmitoleic and oleic acids.

Suitable nonionic surfactants include ethoxylated nonyl (or dodecyl) phenols which, for example, are commercially available from DeSoto, Inc., Des Plaines, Ill. under the trade name Flo Mo 6 N (or Flo Mo 6D); polyethylene glycol ethers of straight chain fatty alcohols including Arnox 1007 which is available from the Arjay Chemical Division of Magna Corp., Houston, Tex.; and ethoxylated castor oils including Chemax CO-30 which is available from Chemax, Inc., Greenville, S.C.

The aqueous emulsion of copolymerized monoethylenically unsaturated monomers having a sufficiently low glass transition temperature to coalesce on air drying is subject to wide variation because so many copolymers are known which are broadly applicable. Acrylic copolymers which comprise monoethylenically unsaturated monomers, at least 50 percent of which are esters of acrylic acid or methacrylic acid with a $C_1$ to $C_8$ alcohol, are particularly contemplated, however, since these copolymers are durable on exterior exposure.

Suitable monoethylenically unsaturated monomers also include butyl acrylate, vinyl acetate, methyl acrylate, ethyl acrylate, methyl methacrylate, styrene, 2-ethyl hexylacrylate, vinyl toluene, acrylonitrile, vinylidene chloride and the like. Minor amounts, generally, less than about 5 percent by weight (based on the weight of the emulsion) of monomers having a functional group other than an ethylenic group, for example, acrylic acid, acrylamide, methylol acrylamide, aminoacrylates, or hydroxyethyl acrylates, and the like may also be present.

Preferably the monoethylenically unsaturated monomers are selected so as to produce a copolymer having a glass transition temperature (Tg) below about room temperature so that the individual copolymer particles, when applied on a selected surface as a coating, will coalesce by themselves to provide a substantially continuous polymeric film without the need to apply external heat.

The aqueous emulsion of copolymerized monoethylenically unsaturated monomers may further include an amount of a water immiscible organic solvent sufficient to lower the Tg, and thus the coalescing temperature, of the copolymerized monomers to the desired value.

When using higher glass transition temperature emulsion polymers, especially those having a Tg above 20 degrees C., water immiscible organic solvents are helpful as coalescing agents in amounts of from 1-15 percent based on the weight of the emulsion. These water-immiscible solvents are illustrated by ester alcohols like 2,2,4 trimethyltentanediol-1,3 monoisobutyrate, mineral spirits, 2-phenoxy ethanol, methyl octyl ketone, 2-ethyl hexanol and aromatic hydrocarbon mixtures such as Solvesso 150.

Any ethylenically unsaturated oil, or fatty acid derived therefrom, may be used herein, including drying oils, semi-drying oils, and the fatty acids therein. These are illustrated by dehydrated castor oil, linseed oil, linseed fatty acid and the like. These oils are used as emulsions in water using surfactants well known for the purpose, as illustrated previously. The preferred surfactants include polysorbitan esters, as is also well known.

The drying catalysts may be any of those customarily used to speed the oxidative drying of unsaturated oils. These are usually octoates or naphthenates of metals, especially cobalt. The catalyst is normally used in an amount of 0.01 percent to 2 percent of the weight of the oil.

While several aqueous components are combined to form the present coating composition, all proportions expressed herein are by weight based on the solids content of the particular components, except in the examples.

The composition may also include pigments, preferably comprising finely divided silica in admixture with a platy clay. The pigment masks any observable blushing of the coating. Blushing is the tendency of a coating to whiten or become opaque upon exposure to moisture. Thickeners, such as hydroxyethyl cellulose, may be employed to provide the desired coating rheology. Preservatives may also be present as well as defoamers to minimize foaming as the various components are blended together. The use of such materials will be apparent to those skilled in the art, but those materials are not essential aspects of this invention. The foregoing proportions do not include the weight of any pigment (or thickener, preservative or defoamer) that may be present.

The specified combination of components enables a large proportion of wax solids to be stably incorporated into an aqueous medium which solidifies on air drying to provide a continuous and durable water-repellent film. The wax slowly and progressively exudes to the surface of the coating over a long period of time to provide the desired long-term water resistance. Moreover, the mixture of paraffin wax and polyethylene wax with the aqueous emulsion of copolymerized monoethylenically unsaturated monomers provides a durable film having immediate water-repellent properties.

Preferred embodiments of the invention are illustrated in the following Examples.

EXAMPLE 1

| Component | Pounds | Gallons |
| --- | --- | --- |
| water | 120 | 12 |
| hydroxyethyl cellulose | 1.5 | 0.11 |
| propyl mercuric acetate preservative | 2 | 0.15 |
| tetrapotassium pyrophosphate | 1 | 0.04 |
| defoaming agent[1] | 3 | 0.33 |
| platy clay[2] | 10 | 0.42 |
| finely divided silica[3] | 70 | 2.64 |

The above components are dispersed in a Hockmeyer blender and then the following components are added, one at a time:

| Component | Pounds | Gallons |
| --- | --- | --- |
| acrylic copolymer emulsion at about 46 percent solids[4] | 320 | 29.91 |
| water | 50 | 5.00 |
| defoaming agent | 2 | 0.22 |
| aqueous wax dispersion at about 39 percent solids[5] | 80 | 8.00 |
| water | 220 | 22 |
| premix the following and add water | 20 | 2.00 |
| hydroxyethyl cellulose | 1 | 0.07 |
| 2,2,4 trimethyltentane-diol-1,3 monoisobutyrate | 10 | 1.00 |

[1] Any water-dispersible defoaming agent suitable for use in water-based coating compositions may be used including Foamaster DF-122NS (Diamond Shamrock Corp., Morristown, NJ), SAG Silicone Antifoam 4220 (Union Carbide Corp., Danbury, CT) and Albon 781 (Finetex, Inc., Elmwood Park, NJ).
[2] Attapulgus clay (Attagel 50, which is commercially available from Engelhard Minerals & Chemical Corp., Menlo Park, NJ) may be used.
[3] Imsil A-15 (commercially available from Illinois Minerals Co., Cairo, IL) may be used.
[4] An aqueous emulsion copolymer of methyl methacrylate and ethyl acrylate in a weight ratio of 2:1 containing 1 percent by weight of acrylic acid. Rohm and Haas product AC-61 (Rohm and Haas Co., Philadelphia, PA) may be used.
[5] MichemLube 270 (Michelman Chemicals, Inc., Cinncinati, OH) may be used.

The aqueous was dispersion that was used included about 38-39 percent non-volatile materials based on the weight of the composition. The dispersion had a nitrogen content of about 0.01 percent, an acid value of about 0.4 milligrams (mg) potassium hydroxide per gram of sample, and an amine value of about 0.2 milliequivalents per gram of sample.

The non-volatile materials of the wax dispersion include about 56 percent paraffin wax, about 17 percent high molecular weight polyethylene was and, as sufactants, about 27 percent carboxylic acid salts of myristic, palmitoleic and oleic acids by weight. The term "high molecular weight" is used in the accepted manner with reference to polyethylene wax to indicate such waxes having number average molecular weights greater than about 10,000.

A composition of the type described in the foregoing example may be applied to a wood surface, such as an unsealed cedar board, to provide a clear coating which dries in air without heating and provides a continuous film to protect the wood. Some exudation of wax occurs shortly after drying as indicated by the beading of water placed on the film, and the exudation of wax continues with time to provide long-term exterior durability as indicated by weatherometer testing and by exterior exposure. The coating may be further pigmented, if desired, to incorporate desired coloration.

From the standpoint of commercial practice, the concentration of non-volatile solid materials in the final composition is preferably from about 5 percent to about 40 percent. Also, the pigment can be omitted or it can be used in a larger amount than in the foregoing Example. Thus, this invention can be practiced using a pigment to binder weight ratio of from about 0 to about 1.0.

EXAMPLE 2

| Component | Pounds |
|---|---|
| water | 120 |
| hydroxyethyl cellulose | 2 |
| propyl mercuric acetate preservative | 1 |
| tetrapotassium pyrophosphate | 1 |
| defoaming agent[1] | 1 |
| platy clay[2] | 35 |
| finely divided silica[3] | 100 |

The above components are dispersed in a Hockmeyer blender and then the following components are added, one at a time:

| Component | Pounds |
|---|---|
| premix the following and add water | 100 |
| acrylic copolymer emulsion at about 46 percent solids[4] | 256.8 |
| premix the following and add water | 80 |
| hydroxyethyl cellulose | 4 |
| 2,24 trimethyltentane-diol-1,3 monoisobutyrate | 7 |
| continue to add one at a time ethylene glycol | 17 |
| dioctyl sodium sulfosuccinate | 0.75 |
| defoaming agent | 4 |
| linseed oil emulsion | 90 |
| cobalt naphthenate (6 percent in mineral spirits) | 2 |
| water | 180 |
| aqueous wax dispersion at about 39 percent solids[5] | 100 |

The linseed oil emulsion used in the above Example is as follows:

| Component | Pounds |
|---|---|
| linseed oil | 744 |
| sorbitan trioleate | 6 |
| sorbitan monolaurate | 14 |
| admix the above at high speed for 5 minutes and add water | 200 |
| sorbitan trioleate polysorbate | 7 |
| nonylphenoxy polyethanol (HLB = 13) | 39 |
| admix the above at high speed for 10 minutes | 10 |
| cobalt naphthenate (6 percent in mineral spirits) defoaming agent | |
| water | 100 |

This composition is similar to that provided in Example 1, but the dried coatings possess greater flexibility adhesion on horizontal surfaces. Better freeze-thaw and wear resistance are also provided.

What is claimed is:

1. An aqueous coating composition which dries to provide a continuous film from which a wax will slowly and progressively exude to provide a water-repellent surface that confers long-term water resistance consisting essentially of from about 5 percent to about 50 percent of an aqueous wax dispersion including at least about 30 percent of a petroleum wax, at least about 10 percent of a polyethylene wax and an amount of a surfactnat sufficient to stabilize the dispersion; and from about 50 percent to about 95 percent of an aqueous emulsion of copolymerized monoethylenically uh-saturated monomers having a sufficiently low glass transition temperature to coalesce on air drying, said proportions being by weight of solids based on the total solids not including any pigment, thickener, preservative or defoamer which may be present.

2. The aqueous coating composition according to claim 1 in which said aqueous wax dispersion is present in an amount of from about 15 percent to about 40 percent.

3. The aqueous coating composition according to claim 1 wherein the petroleum wax has a melting point from about 50 degrees C. to about 70 degrees C.

4. The aqueous coating composition according to claim 1 in which the petroleum wax comprises a paraffin wax and the aqueous wax dispersion includes from about 40 percent to about 70 percent of the paraffin wax, from about 15 percent to about 25 percent of the polyethylene wax and at least about 5 percent of the surfactant, based on the weight of the dispersion.

5. The aqueous coating composition according to claim 1 in which the petroleum wax comprises a paraffin wax and the aqueous wax dispersion includes from about 50 percent to about 60 percent of the paraffin wax, about 20 percent of the polyethylene wax and at least about 20 percent of the surfactant, based on the weight of the dispersion.

6. The aqueous coating composition according to claim 1 in which said copolymerized monoethylenically unsaturated monomers are present in an amount of from about 60 percent to about 85 percent, based on the weight of the composition.

7. The aqueous coating composition according to claim 1 in which at least 50 percent of said copolymerized monoethylenically unsaturated monomers are esters of acrylic acid or methacrylic acid with a $C_1$ to $C_8$ alcohol.

8. The aqueous coating composition according to claim 1 in which said copolymerized monoethylenically unsaturated monomers include methyl methacrylate and ethyl acrylate in a weight ratio of about 2:1.

9. The aqueous coating composition according claim 8 in which said copolymerized monoethylenically unsaturated monomers further include about 1 percent by weight of acrylic acid.

10. The aqueous coating composition according to claim 1 wherein the surfactant comprises at least one ammonium or alkali metal salt of a $C_{10}$ to $C_{22}$ saturated or unsaturated carboxylic acid.

11. The aqueous coating composition according to claim 1 including from about 5 percent to about 40 percent non-volatile materials.

12. The aqueous coating composition according to claim 1 having a pigment to binder weight ratio of from about 0 to about 1.0.

13. The aqueous coating composition according to claim 1 including from 5 percent to 50 percent of an ethylenically unsaturated oil or fatty acid derived therefrom together with a catalyst to speed-the drying thereof.

14. The aqueous coating composition according to claim 13 in which linseed oil is used in an amount of from 10 percent to 40 percent together with a cobalt naphthenate catalyst.

* * * * *

UNITED STATES PATENT AND TRADEMARK OFFICE
CERTIFICATE OF CORRECTION

PATENT NO. : 4,681,910
DATED : July 21, 1987    Page 1 of 2
INVENTOR(S) : William B. Crockatt et al.

It is certified that error appears in the above-identified patent and that said Letters Patent is hereby corrected as shown below:

Column 6, line 51, "was" should read --wax-- ;

Column 7, lines 35 and 36 should read:
--continue to add one at a time
   ethylene glycol                17--

The Table at Column 7, lines 51-63 should read:

| Component | Pounds |
|---|---|
| linseed oil | 744 |
| sorbitan trioleate | 6 |
| sorbitan monolaurate | 14 |
| admix the above at high speed for 5 minutes and add | |
| water | 200 |
| sorbitan trioleate polysorbate | 7 |
| nonylphenoxy polyethanol (HLB = 13) | 39 |
| admix the above at high speed for 10 minutes | |
| cobalt naphthenate (6 percent in mineral spirits) | 10 |
| defoaming agent | 10 |
| water | 100 |

Column 8, lines 9 and 10, "sur-factnat" should read: --surfactant--; and

UNITED STATES PATENT AND TRADEMARK OFFICE
CERTIFICATE OF CORRECTION

PATENT NO. : 4,681,910
DATED : July 21, 1987
INVENTOR(S) : William B. Crockatt et al It is certified that error appears in the above-identified patent and that said Letters Patent is hereby corrected as shown below:

Column 8, lines 12 and 13, "sur-factnat" should read -- un-saturated --.

Signed and Sealed this

Fifteenth Day of March, 1988

Attest:

DONALD J. QUIGG

Attesting Officer    Commissioner of Patents and Trademarks

UNITED STATES PATENT AND TRADEMARK OFFICE
CERTIFICATE OF CORRECTION

PATENT NO. : 4,681,910

DATED : July 21, 1987

INVENTOR(S) : William B. Crockatt et al.

It is certified that error appears in the above-identified patent and that said Letters Patent is hereby corrected as shown below:

Column 6, line 51, "was" should read --wax-- ;

Column 7, lines 35 and 36 should read:
--continue to add one at a time
   ethylene glycol             17--

The Table at Column 7, lines 51-63 should read:

| Component | Pounds |
|---|---|
| linseed oil | 744 |
| sorbitan trioleate | 6 |
| sorbitan monolaurate | 14 |
| admix the above at high speed for 5 minutes and add | |
| water | 200 |
| sorbitan trioleate polysorbate | 7 |
| nonylphenoxy polyethanol (HLB = 13) | 30 |
| admix the above at high speed for 10 minutes | |
| cobalt naphthenate (6 percent in mineral spirits) | 10 |
| defoaming agent | 10 |
| water | 100 |

Column 8, lines 9 and 10, "sur-factnat" should read: --surfactant--; and

UNITED STATES PATENT AND TRADEMARK OFFICE
CERTIFICATE OF CORRECTION

PATENT NO. : 4,681,910

DATED : July 21, 1987

INVENTOR(S) : William B. Crockatt et al

It is certified that error appears in the above-identified patent and that said Letters Patent is hereby corrected as shown below:

Column 8, lines 12 and 13, "uh-saturated" should read: --un-saturated--.

This certificate supersedes certificate of correction issued March 15, 1988.

Signed and Sealed this

Twenty-eighth Day of June, 1988

Attest:

DONALD J. QUIGG

Attesting Officer

Commissioner of Patents and Trademarks